US012368958B2

(12) United States Patent
Osaka

(10) Patent No.: US 12,368,958 B2
(45) Date of Patent: Jul. 22, 2025

(54) OPTICAL APPARATUS AND IMAGE PICKUP APPARATUS HAVING THE SAME

(71) Applicant: CANON KABUSHIKI KAISHA, Tokyo (JP)

(72) Inventor: Hiroki Osaka, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 138 days.

(21) Appl. No.: 18/175,286

(22) Filed: Feb. 27, 2023

(65) Prior Publication Data

US 2023/0292006 A1 Sep. 14, 2023

(30) Foreign Application Priority Data

Mar. 10, 2022 (JP) ................................. 2022-036741

(51) Int. Cl.
*H04N 23/68* (2023.01)
*G02B 27/64* (2006.01)

(52) U.S. Cl.
CPC ......... *H04N 23/687* (2023.01); *G02B 27/646* (2013.01); *H04N 23/683* (2023.01)

(58) Field of Classification Search
CPC ............................ H04N 23/687; G02B 27/646
See application file for complete search history.

(56) References Cited

U.S. PATENT DOCUMENTS

| 6,091,900 | A | * | 7/2000 | Kaneda | G02B 27/646 |
| | | | | | 348/208.11 |
| 2010/0060781 | A1 | * | 3/2010 | Yumiki | G02B 7/102 |
| | | | | | 348/E5.045 |
| 2022/0070341 | A1 | * | 3/2022 | Seo | H04N 23/51 |

FOREIGN PATENT DOCUMENTS

| JP | H08248289 A | 9/1996 |
| JP | 2005292212 A | 10/2005 |
| JP | 2009192894 A | 8/2009 |
| JP | 2010072062 A | 4/2010 |
| JP | 2012103555 A | 5/2012 |
| JP | 2012230433 A | 11/2012 |
| JP | 2021021844 A | 2/2021 |

\* cited by examiner

*Primary Examiner* — Minh Q Phan
(74) *Attorney, Agent, or Firm* — Canon U.S.A., Inc. IP Division

(57) ABSTRACT

A lens apparatus comprises a second lens holding frame configured to hold a second lens unit, two shaft members configured to hold the second lens holding frame movably along an optical axis, a lens driving unit configured to drive the second lens holding frame along the optical axis, a shake correction unit configured to move a shake correction unit in a plane orthogonal to the optical axis, and a main base configured to hold the lens driving unit and the shake correction unit, wherein at least one of the two shaft members is disposed on an outer side of the shake correction unit when viewed in an optical axis direction, and wherein the shake correction unit and the two shaft members are disposed to always overlap each other in the optical axis direction.

8 Claims, 7 Drawing Sheets

OPTICAL APPARATUS AND IMAGE PICKUP APPARATUS HAVING THE SAME

BACKGROUND

Field of the Disclosure

The present disclosure relates to an optical apparatus and an image pickup apparatus having the same.

Description of the Related Art

An optical apparatus may have both a function of suppressing image blur during hand-held photographing and a function of electrically performing zooming and focusing a lens group that shifts in a plane orthogonal to the optical axis and a lens group that shifts linearly in the optical axis direction. Japanese Patent Application Laid-Open No. 2012-103555 discloses an image pickup apparatus having a configuration in which a part of a focus driving unit penetrates an image blur correction device so as not to interfere with the image blur correction device.

However, when a lens group that shifts in a plane orthogonal to the optical axis and a lens group that shifts linearly in the optical axis direction are disposed in the same lens barrel, it is necessary to arrange the lens groups so as not to interfere with each other. Further, actuators corresponding to the respective lens groups are also required, and it is necessary to arrange the actuators so as not to interfere with each other and not to hinder the movement of the lens groups. These factors may hinder the miniaturization of the lens apparatus.

SUMMARY

An aspect of embodiments provides, a compact optical apparatus including both a correction unit and a linear motion unit.

According to an embodiment of the present disclosure, an optical apparatus comprising: a first member configured to hold a first optical system; two shaft members configured to hold the first member movably along an optical axis; a driving unit configured to drive the first member along the optical axis; a correction unit configured to move a correction optical system in a plane orthogonal to the optical axis; and a base member configured to hold the driving unit and the correction unit, wherein at least one of the two shaft members is disposed on an outer side of the correction unit when viewed in an optical axis direction, and wherein the correction unit and the two shaft members are disposed to always overlap each other in the optical axis direction.

Further features of the present disclosure will become apparent from the following description of embodiments with reference to the attached drawings.

DESCRIPTION OF THE EMBODIMENTS

Figure 1:
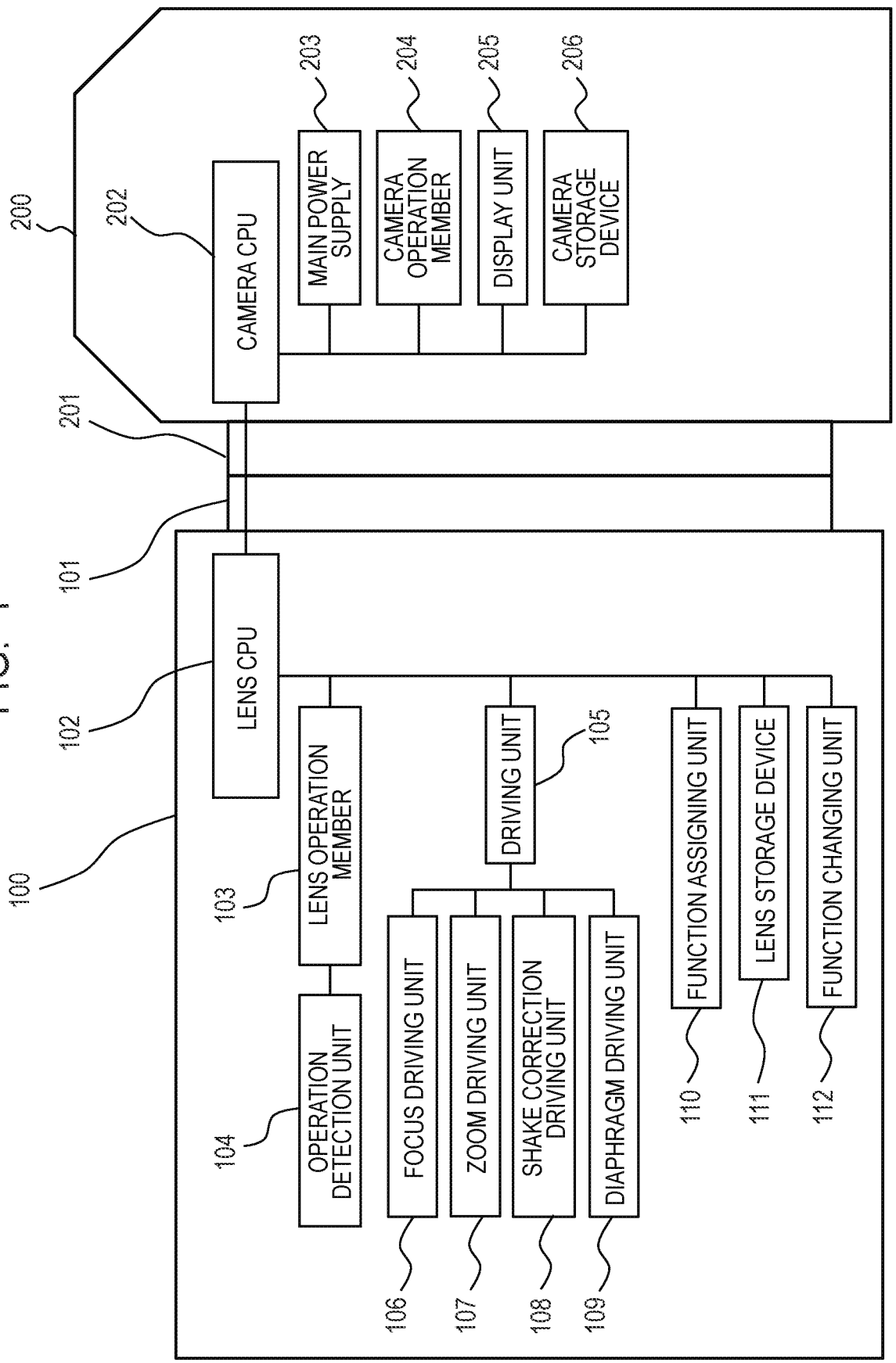
FIG. 1 is a connection configuration diagram of a lens apparatus (100) and a camera apparatus (200) according to the present disclosure.

Preferred embodiments of the present disclosure will now be described in detail in accordance with the accompanying drawings. In the drawings, the same members are denoted by the same reference numerals, and overlapping description will be omitted.

First, an outline of an image pickup apparatus according to an embodiment of the present disclosure will be described with reference to FIG. 1. FIG. 1 is a connection configuration diagram of a lens apparatus 100 (optical apparatus) and a camera apparatus 200 (image pickup apparatus) according to the present disclosure.

The lens apparatus 100 includes a lens mount 101 for mechanically connecting the lens apparatus 100 to a camera mount 201 of a camera apparatus 200 to be described below.

The lens apparatus 100 is provided with a lens CPU 102, and the lens CPU 102 performs control and communication of the entire lens apparatus 100, communication with the camera apparatus 200, and control of functions implemented in the camera apparatus 200.

The lens operation member 103 operates various functions of the lens apparatus 100, selects, determines, and controls various functions, and is connected to the lens CPU 102.

The operation detection unit 104 detects an operation direction and an operation amount of a function ring (not illustrated). The operation detection unit 104 is, for example, a photo interrupter (not illustrated), and detects an operation direction and an operation amount of the function ring by detecting light reception and light shielding according to a rectangular wave shape (not illustrated) provided on an inner diameter of the function ring.

The driving unit 105 includes, for example, a focus driving unit 106, a zoom driving unit 107, a shake correction driving unit 108, and a diaphragm driving unit 109, and drives various functions.

The focus driving unit 106 is connected to a focus lens unit (not illustrated). The focus driving unit 106 moves the focus lens unit in a direction along an optical axis OA (to be described later) in accordance with an operation direction and an operation amount at the time of operation of a focus ring (not illustrated) to move the focus position of the lens apparatus 100.

The zoom driving unit 107 is connected to a zoom lens unit (not shown), and changes the focal length of the lens apparatus 100 and an angle of view by moving the zoom lens unit in a direction along the optical axis OA in accordance with an operation direction and an operation amount at the time of operation of a zoom ring (not illustrated).

The shake correction driving unit 108 is connected to a shake correction lens unit (not illustrated). Further, the diaphragm driving unit 109 is connected to a light amount adjusting blade (not illustrated) and moves the light amount adjusting blade in accordance with an operation of the camera apparatus 200 to adjust the amount of light incident on an image pickup element (not illustrated) of the camera apparatus 200.

The function assigning unit 110 can assign the above-described various functions to the function ring. Further, the camera apparatus 200 can access the function assigning unit 110 to assign functions.

The lens storage device 111 stores information in which priorities of function assignment are determined in advance in order to automatically assign functions to the function rings. A function changing unit 112 changes the function assigned to the function ring to another function.

Next, the camera apparatus 200 will be described. The camera apparatus 200 includes a camera mount 201, and the camera mount 201 is mechanically connected to a lens mount 101.

The camera CPU 202 performs control and communication of the entire camera apparatus 200 and control and communication of the lens apparatus 100.

The main power supply 203 operates ON and OFF of a power supply for energizing the camera apparatus 200. The camera operation member 204 performs operations such as operations of various functions of the camera apparatus 200 and operations such as selection, determination, cancellation, and release of various functions. The display unit 205 displays various settings of the camera apparatus 200 and captured images. The camera storage device 206 stores various settings and captured images of the camera apparatus 200.

Figure 2:
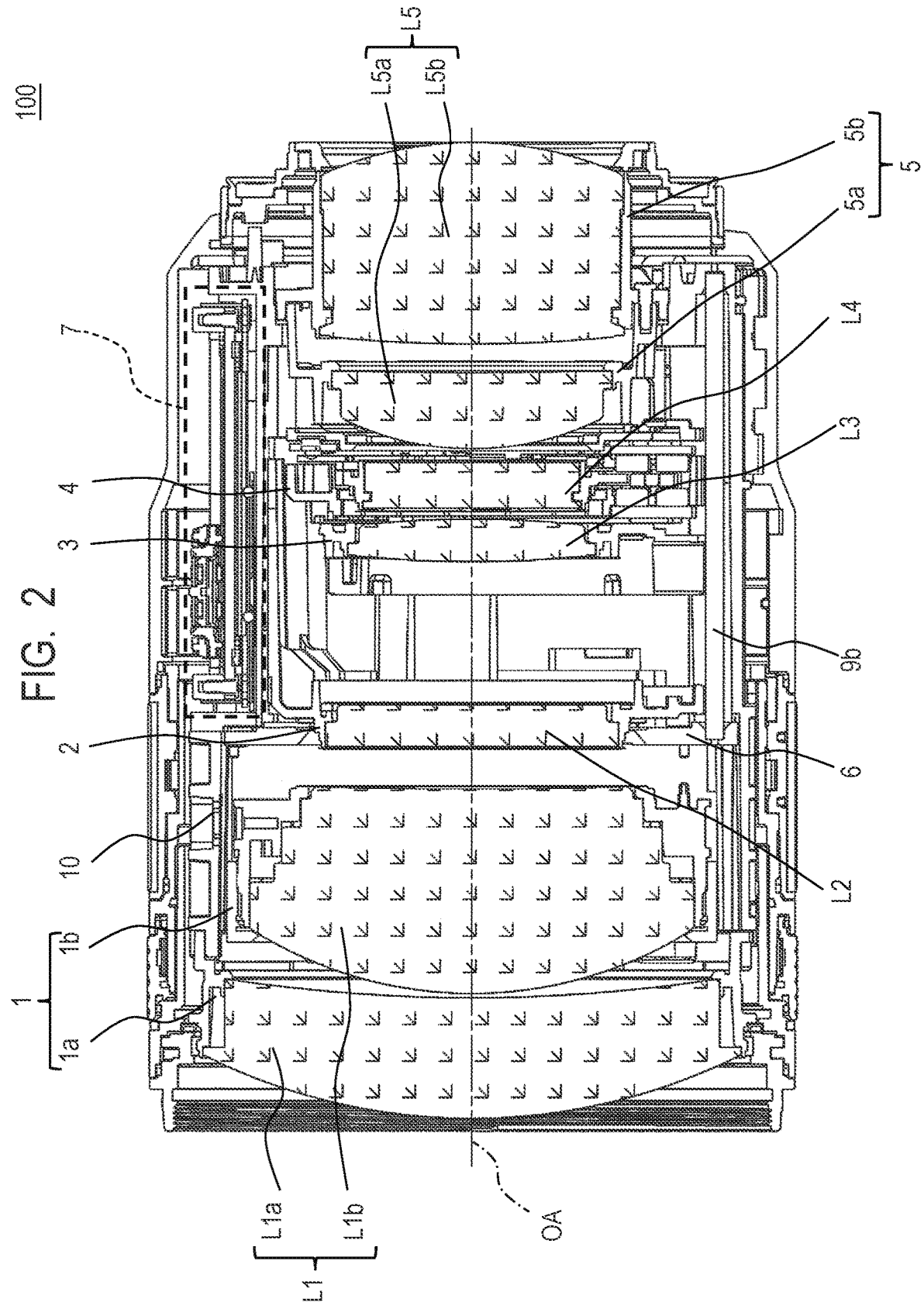
FIG. 2 is a configuration diagram of the lens apparatus (100).
Figure 3:
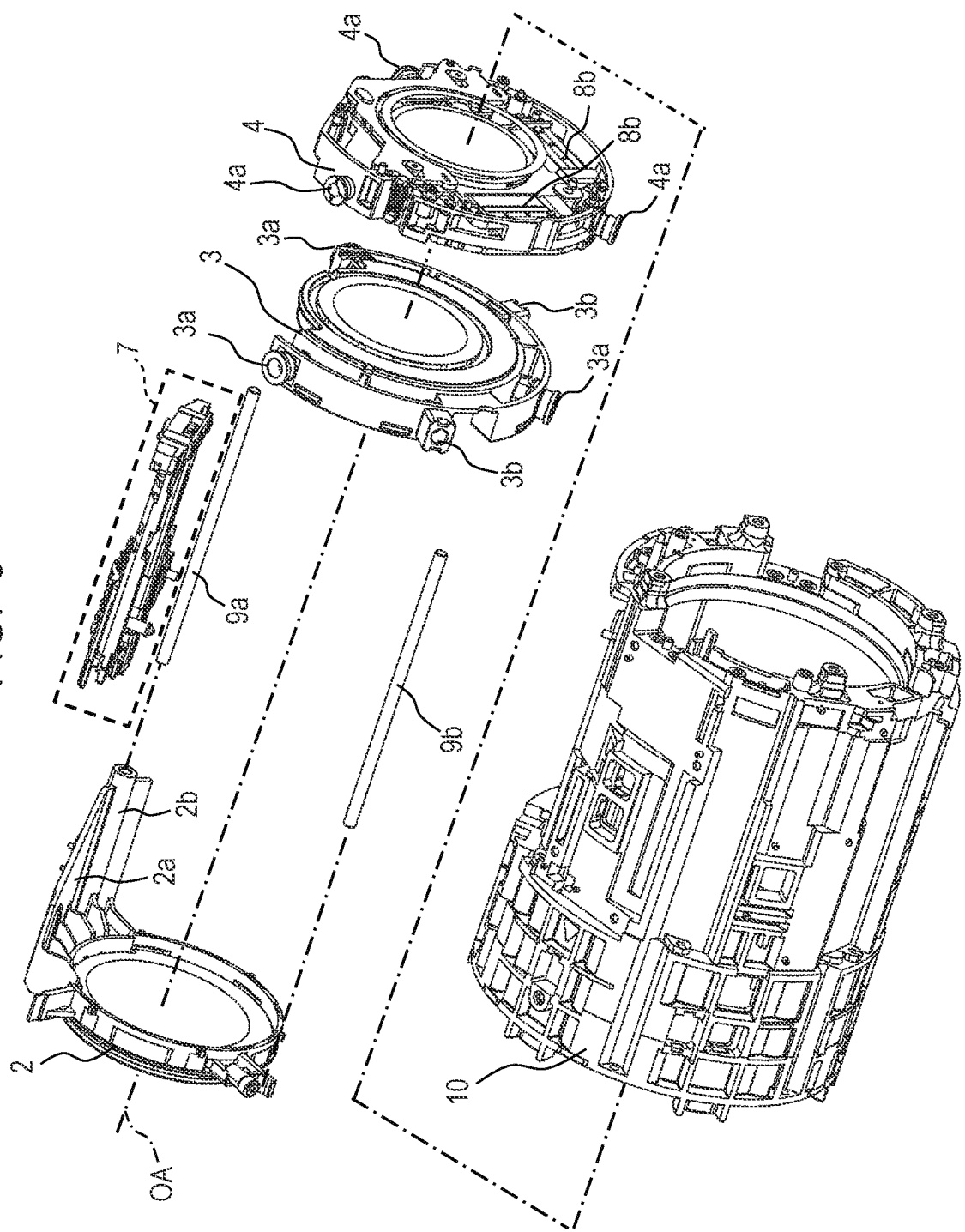
FIG. 3 is an exploded perspective view of the lens apparatus (100).

Next, a schematic configuration of the lens apparatus 100 according to the present embodiment will be described with reference to FIGS. 2 to 4. As an imaging optical system, the lens apparatus 100 includes lens units arranged in the order of a first lens unit L1, a second lens unit L2 (first optical system), a third lens unit L3 (second optical system), a shake correction lens unit L4 (correction optical system), and a fifth lens unit L5.

The first lens unit L1 includes a 1a lens L1a on the object side, and a 1b lens L1b on the image plane side adjacent thereto. The first lens holding frame 1 is composed of a 1a lens holding frame L1a for holding a 1a lens 1a and a 1b lens holding frame L1b for holding a 1b lens 1b, and holds the first lens unit L1.

The second lens holding frame 2 (first member) holds the second lens unit L2, the third lens holding frame 3 (second member) holds the third lens unit L3, and the shake correction lens holding frame 4 holds the shake correction lens unit L4.

The fifth lens unit L5 is composed of a 5a lens L5a arranged on the object side and a 5b lens L5b arranged on the image plane side adjacent thereto. The fifth lens holding frame 5 is composed by a 5a lens holding frame 5a that holds the 5a lens L5a and a 5b lens holding frame 5b that holds the 5b lens L5b, and holds the fifth lens unit L5.

The first lens holding frame 1, the third lens holding frame 3, the shake correction lens holding frame 4, the fifth lens holding frame 5, the lens driving unit 7 (driving unit), and the shake correction unit 8 (correction unit) are held by a main base 10 (base member). The third lens holding frame 3 is fixed to the main base 10 between the second lens holding frame 2 and the shake correction lens holding frame 4 having the shake correction unit 8.

In addition, the lens apparatus 100 includes a main bar 9a and a sub-bar 9b which are two shaft members that hold the second lens holding frame 2 movably along the optical axis OA. An end portion of each of the main bar 9a and the sub-bar 9b on the image plane side is held by the main base 10, and the other end portion thereof is held by the bar holder 6 fixed to the main base 10. The bar holder 6 is provided closer to the object side than the second lens holding frame 2, and the main bar 9a and the sub-bar 9b are held by a receiving portion having a receiving shape provided on the image plane side of the main base 10 beyond the third lens holding frame 3 and the shake correction lens holding frame 4.

The second lens holding frame 2 is guided by the main bar 9a and the sub-bar 9b, receives a driving force generated by a lens driving unit 7 which is a linear motion unit linearly shifting in the optical axis direction, and is driven back and forth in a direction along the optical axis OA. The lens driving unit 7 is an actuator that performs forward and backward driving by converting vibration of a piezoelectric element, which causes vibration of a frequency in an ultrasonic region when a high-frequency voltage is applied, into a driving force in a rectilinear direction.

Next, with reference to FIG. 4, the positional relationship between the shake correction unit 8 and the lens driving unit 7 for shifting the shake correction lens unit L4 in a plane orthogonal to the optical axis OA will be described. FIG. 4 is an arrangement diagram of the shake correction unit 8 and the lens driving unit 7 provided in the shake correction lens holding frame 4 when viewed from the image plane side.

The shake correction unit 8 includes two actuators for shifting the shake correction lens holding frame 4 that holds the shake correction lens unit L4 in a plane orthogonal to the optical axis OA. One of the actuators is composed of magnets (not shown) and a first driving coil 8a, and the other is similarly composed of magnets (not shown) and a second drive coil 8b. The first driving coil 8a is disposed at a position of about 135 degrees in a clockwise direction around the optical axis OA with respect to a straight line OAB connecting the optical axis OA and a substantial center B of the lens driving unit 7 for moving the second lens holding frame 2 forward and backward. Similarly, the second drive coil 8b is disposed at a position of about 135 degrees counterclockwise about the optical axis OA with respect to the straight line OAB. That is, the driving coils 8a and 8b of the first, second are disposed so as to be separated from a straight line OAB connecting the lens driving unit 7 and the optical axis OA by an angle of about 135 degrees in the circumferential direction around the optical axis OA.

The shake correction lens holding frame 4 including the shake correction unit 8 is fixed to the main base 10 via three roller 4a. One roller 4a is disposed at a diagonal position of the lens driving unit 7 with the optical axis OA as a center, and two rollers 4a are disposed at equal angular intervals of 120 degrees with the position as a reference. In this way, by limiting the arrangement of the first and second driving coils 8a, 8b and the rollers 4a, which are made of a first, second and require a large occupied space in the shake correction lens holding frame 4 with respect to the lens driving unit 7, the lens driving unit 7 can be disposed on the inner side, so that the product can be miniaturized.

Figure 6:
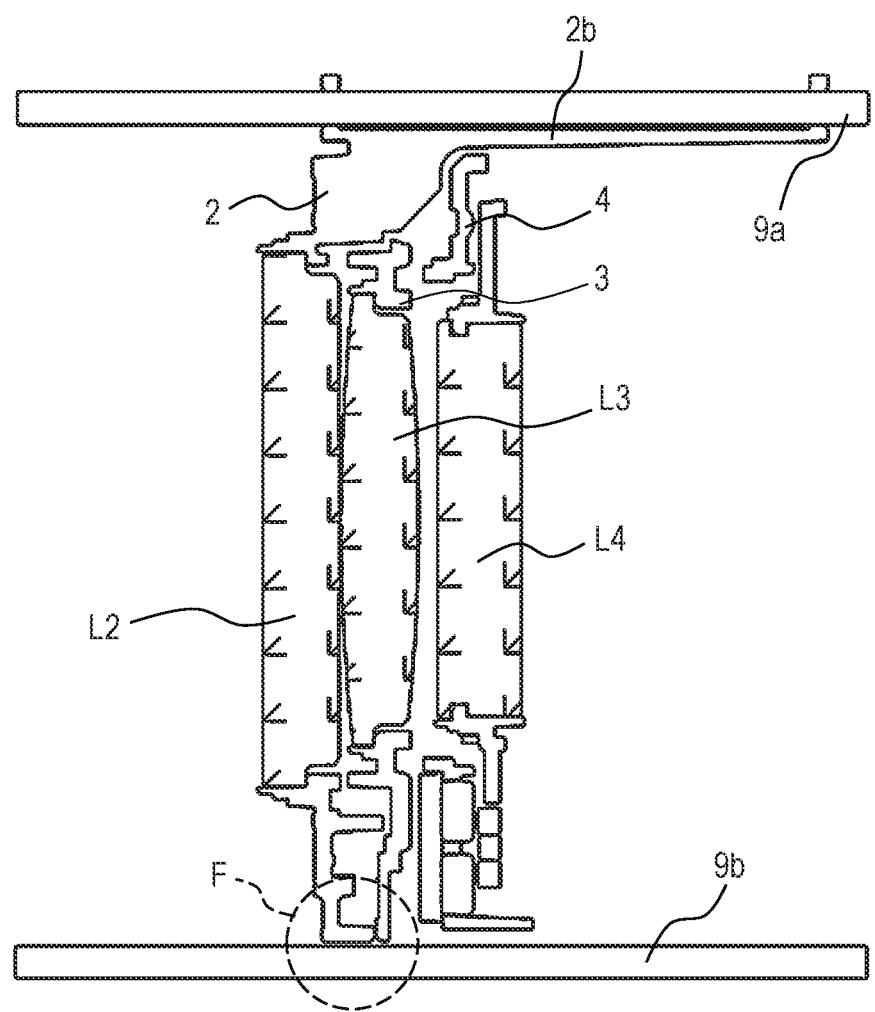
FIG. 6 is a cross-sectional view showing abutting surfaces of the movable lens unit and the fixed lens unit.

When viewed in the optical axis direction, either one of the two shaft members is disposed on the outer side of the shake correction lens holding frame 4 including the shake correction unit 8 and on the inner side of the lens driving unit 7. In the embodiment, the main bar 9a is disposed on the outer side with respect to the shake correction lens holding frame 4 and on the inner side with respect to the lens driving unit 7, and is disposed near the lens driving unit 7 in the circumferential direction (phase) around the optical axis OA. Further, as shown in FIG. 2 or 6, the shake correction lens holding frame 4 including the shake correction unit 8 and the two shaft members are disposed so as to always overlap each other in the optical axis direction. That is, the shake correction unit 8 is disposed within a range in which the two shaft members exist in the optical axis direction. With such a configuration, it is possible to provide a compact lens apparatus 100.

Figure 4:
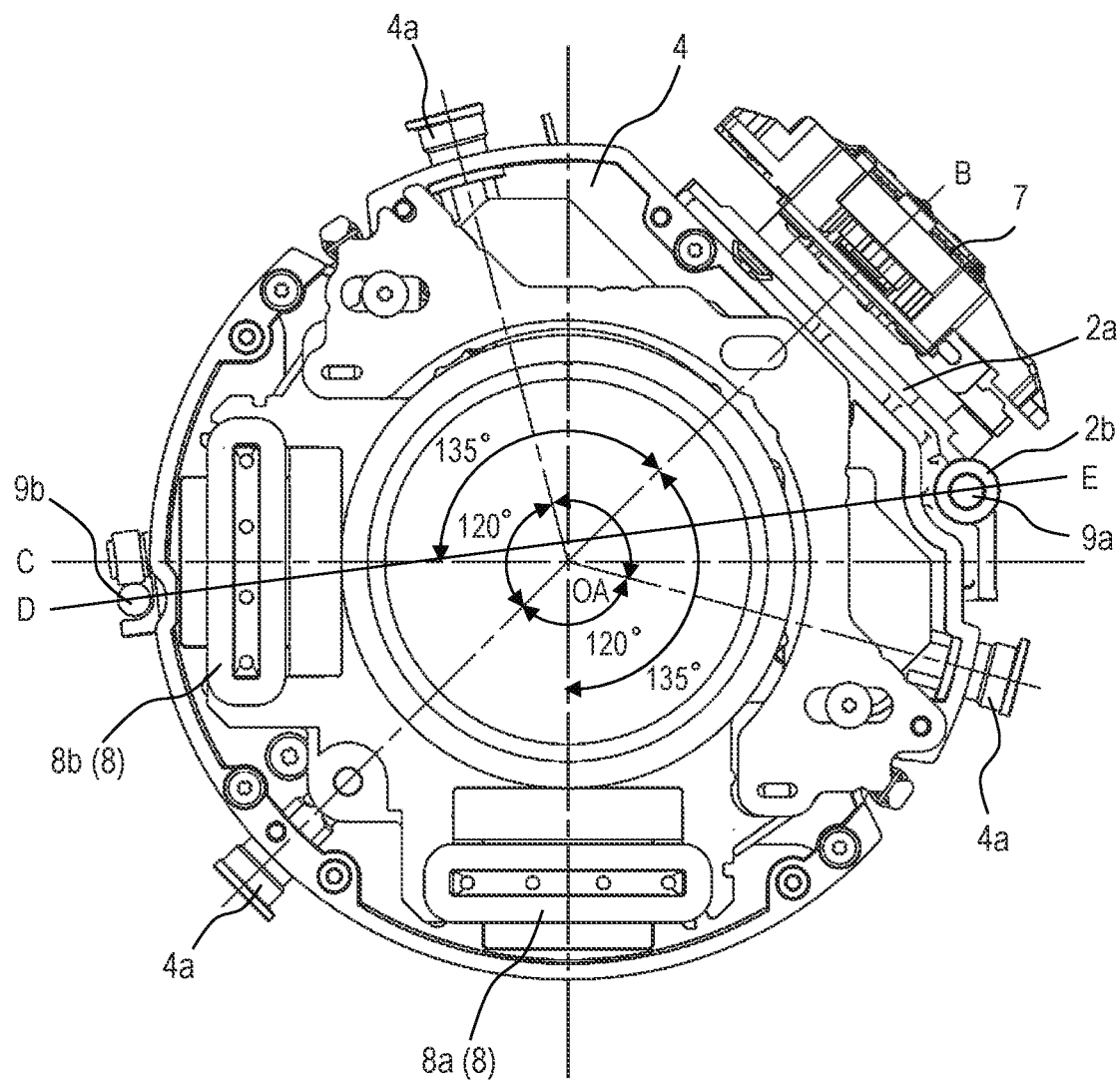
FIG. 4 is an arrangement diagram of the shake correction unit (8) and the lens driving unit (7) viewed from the image plane side.

As shown in FIG. 4, the sub-bar 9b is disposed on the outer side of the of the shake correction unit 8 and on the substantially opposite side of the main bar 9a with the optical axis OA as the center, when viewed from the optical axis direction. In addition, some members composting the actuators operating in the shake correction lens holding frame 4 move integrally with the shake correction lens unit L4. Due to the arrangement relationship with the main bar 9a, the sub-bar 9b is disposed at a position close to either one of the two actuators, but needs to be disposed so as to avoid the driving range of the actuators, which may lead to an increase in the outer of the product. Therefore, one of the two shaft members is disposed substantially on an extension line of a straight line connecting the optical axis OA and one of the first and second driving coils 8a and 8b when viewed from the optical axis direction. In the embodiment, the sub-bar 9b is disposed at a position as close as possible to a substantially extended line OAC of a straight line connecting the optical axis OA and the center of the second drive coil 8b, to minimize a clearance amount in the direction of the outer diameter.

Further, it is desirable to arrange both shaft members so that a distance between a straight line DE connecting the main bar 9a and the sub-bar 9b and the optical axis OA becomes as small as possible. With this arrangement, it is possible to reduce the rotational moment generated in the second lens holding frame 2 around the 9a of the main bar when the second lens holding frame 2 receives an impact such as a drop.

Figure 5:
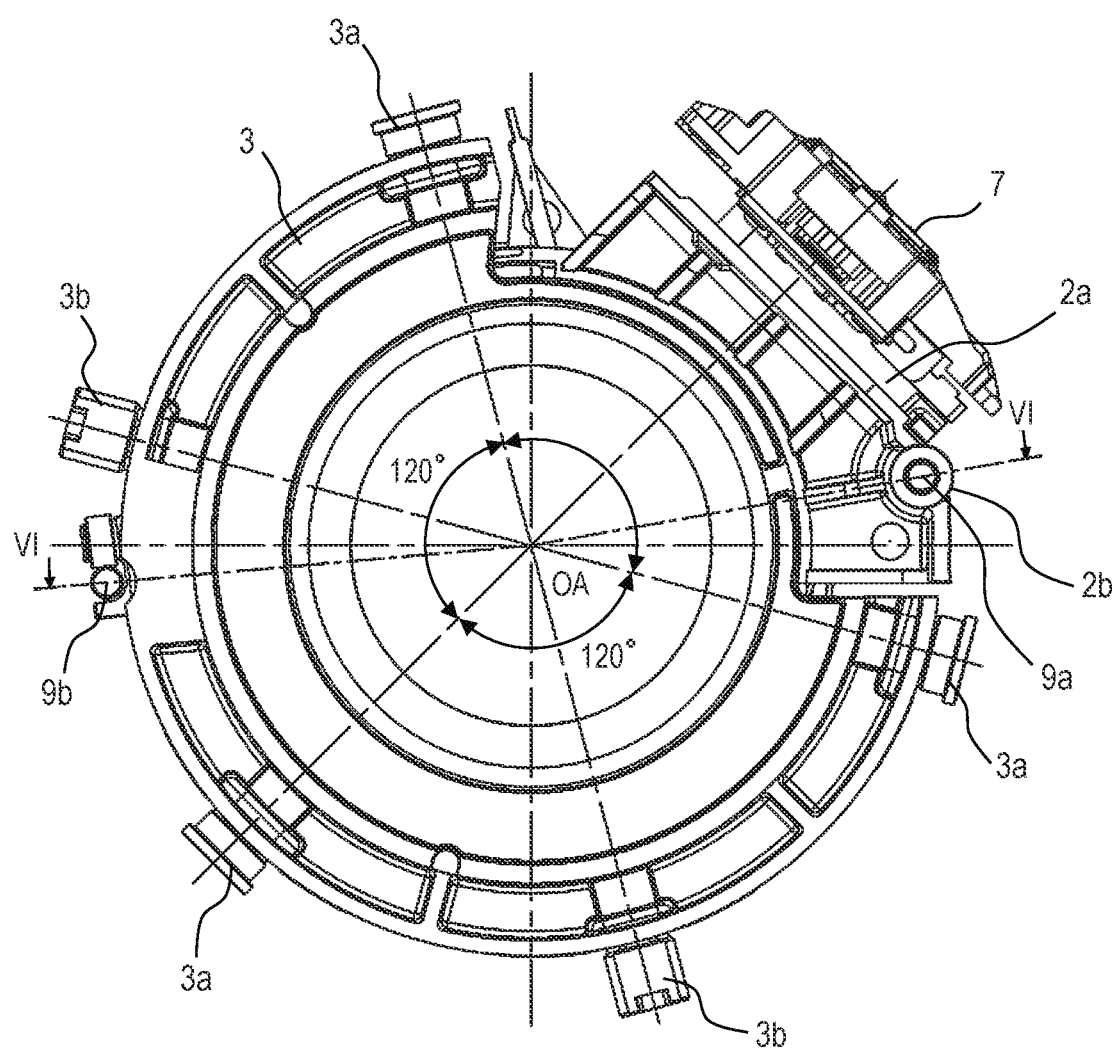
FIG. 5 is a layout view of the third lens holding frame (3) and the lens driving unit (7) viewed from the image plane side.

Next, the positional relationship between the third lens holding frame 3 and the lens driving unit 7 will be described with reference to FIG. 5. FIG. 5 is a layout view of the third lens holding frame 3 and the lens driving unit 7 when viewed from the image plane side.

The third lens holding frame 3 is provided with three main rollers 3a (fixing portions) for fixing a relative position between the third lens holding frame 3 and the main base 10, and the third lens holding frame 3 is fixed to the main base 10 via the main rollers 3a. One of the three main rollers 3a is disposed at a diagonal position of the lens driving unit 7 with the optical axis OA as a center, and with the diagonal position as a reference, the remaining two main rollers 3a are disposed away from the diagonal position at an angle of approximately 120 degrees in a circumferential direction with the optical axis OA as a center.

The third lens holding frame 3 is provided with two sub-rollers 3b (restricting portions) that restrict the movement of the third lens holding frame 3 in the optical axis direction when the third lens holding frame 3 receives an impact. Two sub-rollers 3b are disposed at intermediate positions (phases) between the diagonal positions of the lens driving unit 7 and the main rollers 3a, respectively, except for positions (phases) where the lens driving unit 7 is disposed in the circumferential direction around the optical axis OA.

The third lens holding frame 3 can be restrained to the since the third lens holding frame 3 is adjacent to the second lens holding frame 2 which is a movable group, the third lens holding frame 3 may hit the second lens holding frame 2 due to falling or the like and may receive a strong impact in a direction along the optical axis OA. Since the sub-rollers 3b abut against the main base 10 and restricts further displacement when the third lens holding frame 3 is displaced by a certain amount or more in the direction along the optical axis OA, the displacement of the third lens holding frame 3 can be minimized, and the shock-receiving sub-rollers 3b are effective. And by arranging the sub-roller 3b in the middle of the main roller 3a, the abutting surfaces of the second lens holding frame 2 and the third lens holding frame 3, which will be described later, are sandwiched between the main roller 3a and the sub-roller 3b. With this configuration, it is possible to effectively suppress deformation of the third lens holding frame 3 due to the impact.

As described above, due to the arrangement of each component when viewed in the optical axis direction, both the main bar 9a and the sub-bar 9b can reach the receiving portion of the main base 10 while avoiding the outer sides of the third lens holding frame 3 and the shake correction lens holding frame 4 from the bar holder 6 with a minimum amount of escape. With this configuration, the length and diameters of the main bar 9a and the sub-bar 9b can be set to be the same, and common members can also be used.

Next, the shape of the second lens holding frame 2 and the positional relationship between the third lens holding frame 3 and the shake correction lens holding frame 4 in the direction along the optical axis OA will be described with reference to FIGS. 3 to 6. FIG. 6 is a cross-sectional view taken along line VI-VI of FIG. 5 in the direction of the arrow, showing a state in which the second lens holding frame 2 abuts against the third lens holding frame 3.

The second lens holding frame 2 has a flange 2a receiving energizing force in a direction orthogonal to the optical axis OA from the lens driving unit 7, and a sleeve 2b engaged with the main bar 9a. The flange 2a has a shape that connects the cylindrical portion holding the second lens unit L2 and the sleeve 2b, and serves to ensure rigidity so that the sleeve 2b does not tilt with respect to the second lens unit L2. The flange 2a is provided on the outer side of the shake correction lens holding frame 4 and on the inner side of the main base 10 at a position in the same phase of the lens driving unit 7 with the optical axis OA as the center when viewed from the optical axis direction. The sleeve 2b has a structure in which both end portions in the optical axis direction are engaged with the main bar 9a, and as the interval between the engagement portions is wider, it is possible to suppress the inclination of the second lens holding frame 2 with respect to the optical axis OA to be smaller.

On the other hand, by extending the flange 2a and the sleeve 2b in the direction along the optical axis OA, when the second lens holding frame 2 is driven back and forth, the second lens holding frame 2 overlaps with a peripheral member group. Also in the configuration according to the present disclosure, a part of the flange 2a and a part of the sleeve 2b always overlap the third lens holding frame 3 and the shake correction lens holding frame 4 in the optical axis direction. In the case of a configuration in which the member group driven back and forth in the direction along the optical axis OA and the shake correction lens holding frame 4 driven in the plane orthogonal to the optical axis OA overlap each other, the member group driven back and forth in the direction along the optical axis OA is driven to the outer side due to a balance of space, and a product outer diameter increases.

However, in the configuration of the present disclosure, by optimizing the relative positional relationship between the lens driving unit 7 and the main bar 9a, and the relative positional relationship between the first and second driving coils 8a and 8b, which occupy a particularly large space in the shake correction lens holding frame 4, it is possible to prevent the outer diameter of the product from increasing in size.

According to the present disclosure, it is possible to provide a compact lens apparatus 100 including both a correction unit and a linear motion unit.

Figure 7:
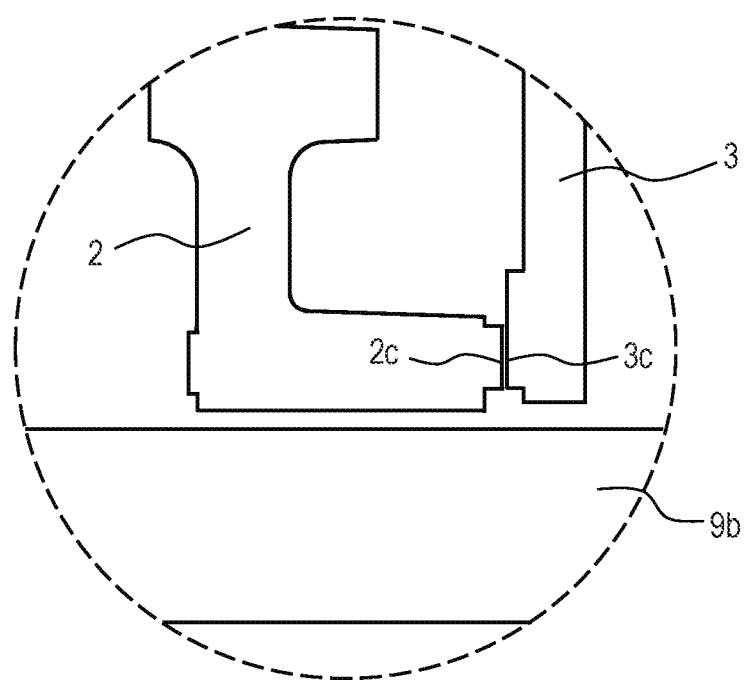
FIG. 7 is a partially enlarged view of FIG. 6.

Next, the abutment between the second lens holding frame 2 and the third lens holding frame 3 will be described with reference to FIGS. 6 and 7. FIG. 7 is an enlarged view of a portion F in FIG. 6.

A protruding surface 2c (first abutting portion) protruding toward the third lens holding frame 3 side is provided in the vicinity where the second lens holding frame 2 is close to the sub-bar 9b. Corresponding to the protruding surface 2c, the third lens holding frame 3 is provided with a receiving surface 3c (second abutting portion) which is protruded from the third lens holding frame 3 toward the second lens holding frame 2 and against which the protruding surface 2c abuts in the driving direction when the second lens holding frame 2 is driven back and forth. The positions of the protruding surface 2c and the receiving surface 3c in the direction along the optical axis OA are set such that the protruding surface 2c and the receiving surface 3c come into contact with each other when the second lens holding frame 2 moves toward the third lens holding frame 3 beyond a driving range assumed in electrical driving control.

A configuration in which a surface for receiving the protruding surface 2c is provided on the main base 10 is also conceivable. However, in such a case, a shape of the impact receiver protruding from the main base 10 toward the inner side is necessary, and a shape of the image plane side must be made a smaller diameter than the object side by the shape of the impact receiver. As a result, it is necessary to either reduce the diameter of the lens in the group located closer to the image plane than the impact receiving shape, or to increase the diameter of the main base 10, which may lead to concerns of a decrease in optical performance and an increase in the size of the product. Further, in the case where the main base 10 is a member injection-molded from resin, there is a concern that providing the shape of the impact receiver in the middle of the member complicates the structure of the mold, leading to an increase in cost. These concerns can be dealt with by providing the third lens holding frame 3 with a receiving surface 3c and improving the resistance to impact with the sub-roller 3b. In addition, as shown in FIG. 5, since the sub-roller 3b and the sub-bar 9b are disposed adjacent to each other, the abutment provided in the vicinity of the sub-bar 9b also has a close positional relationship with the sub-roller 3b. As a result, the resistance to impact of the third lens holding frame 3 is improved.

The lens apparatus 100 to which the present disclosure is applied is used in a camera apparatus 200 including an imaging element that captures an image formed by the lens apparatus 100, or an imaging system including an image pickup apparatus main body that includes an imaging element and to which the lens apparatus 100 is attachable and detachable. Furthermore, the present disclosure is also applicable to a lens-integrated image pickup apparatus.

It should be noted that the present disclosure can exhibit the effect of product miniaturization even when a stepping motor, a voice coil motor, or the like is applied to the lens driving unit 7. Although preferred embodiments of the present disclosure have been described above, the present disclosure is not limited to these embodiments, and various modifications and changes can be made without departing from the scope of the present disclosure.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2022-036741, filed Mar. 10, 2022, which is hereby incorporated by reference herein in its entirety.

What is claimed is:

1. An optical apparatus comprising:
   a first member configured to hold a first optical system;
   two shaft members configured to hold the first member movably along an optical axis;
   a driving unit configured to drive the first member along the optical axis;
   a correction unit configured to move a correction optical system in a plane orthogonal to the optical axis;
   a base member configured to hold the driving unit and the correction unit, and
   a second member that holds a second optical system,
   wherein at least one of the two shaft members is disposed closer to an outer diameter side than the correction unit and closer to an inner diameter side than the driving unit when viewed in an optical axis direction, and
   wherein the correction unit and the two shaft members are disposed to always overlap each other in the optical axis direction,
   wherein the second member includes three fixing portions that fix relative positions of the second member and the base member, and two restricting portions that restrict movement of the second member in the optical axis direction when an impact is applied thereto,
   wherein the second member is fixed to the base member between the first member and the correction unit,
   wherein one of the fixing portions is disposed at a diagonal position of the driving unit, and the remaining two fixing portions are respectively disposed away from the diagonal position by an angle of 120 degrees in a circumferential direction around the optical axis, and
   wherein each of the two restricting portions is disposed between the diagonal position and the fixing portion.

2. The optical apparatus according to claim 1, wherein the correction unit includes a first driving coil and a second driving coil, and wherein either one of the two shaft members is disposed on an extended line connecting the optical axis and either one of the first or second driving coils when viewed in the optical axis direction.

3. The optical apparatus according to claim 2, wherein the first and second driving coils are disposed to be respectively separated from a straight line connecting the driving unit and the optical axis by an angle of 135 degrees in a circumferential direction around the optical axis.

4. The optical apparatus according to claim 1, wherein the driving unit is an actuator that performs forward and backward driving by converting vibration of a piezoelectric element.

5. The optical apparatus according to claim 1,
   wherein the first member is provided with a first abutting portion, and
   wherein the second member is provided with a second abutting portion against which the first abutting portion abuts in a driving direction when the first member is driven back and forth.

6. The optical apparatus according to claim 1, wherein the two shaft members have a same length and diameter.

7. An image pickup apparatus comprising:
   an optical apparatus; and an image pickup element configured to pick up an image formed by the optical apparatus, the optical apparatus comprising:
a first member configured to hold a first optical system;
two shaft members configured to hold the first member movably along an optical axis;
a driving unit configured to drive the first member along the optical axis;
a correction unit configured to move a correction optical system in a plane orthogonal to the optical axis;
a base member configured to hold the driving unit and the correction unit, and
a second member that holds a second optical system,
wherein at least one of the two shaft members is disposed closer to an outer diameter side than the correction unit and closer to an inner diameter side than the driving unit when viewed in an optical axis direction, and
wherein the correction unit and the two shaft members are disposed to always overlap each other in the optical axis direction,
wherein the second member includes three fixing portions that fix relative positions of the second member and the base member, and two restricting portions that restrict movement of the second member in the optical axis direction when an impact is applied thereto,
wherein the second member is fixed to the base member between the first member and the correction unit,
wherein one of the fixing portions is disposed at a diagonal position of the driving unit, and the remaining two fixing portions are respectively disposed away from the diagonal position by an angle of 120 degrees in a circumferential direction around the optical axis, and
wherein each of the two restricting portions is disposed between the diagonal position and the fixing portion.

8. The image pickup apparatus according to claim 7, wherein the optical apparatus is attachable to and detachable from the image pickup apparatus.

\* \* \* \* \*